(12) United States Patent
Lei

(10) Patent No.: US 9,954,391 B2
(45) Date of Patent: Apr. 24, 2018

(54) EMERGENCY POWER SOURCE

(71) Applicant: Shenzhen Carku Technology Co., Ltd, Shenzhen (CN)

(72) Inventor: Xingliang Lei, Shenzhen (CN)

(73) Assignee: SHENZHEN CARKU TECHNOLOGY CO., LTD, Bantian, Longgang District, Shenzhen (CN)

( * ) Notice: Subject to any disclaimer, the term of this patent is extended or adjusted under 35 U.S.C. 154(b) by 300 days.

(21) Appl. No.: 14/759,404

(22) PCT Filed: Nov. 8, 2013

(86) PCT No.: PCT/CN2013/086774
§ 371 (c)(1),
(2) Date: Jul. 6, 2015

(87) PCT Pub. No.: WO2014/106407
PCT Pub. Date: Jul. 10, 2014

(65) Prior Publication Data
US 2015/0340907 A1    Nov. 26, 2015

(30) Foreign Application Priority Data

Jan. 7, 2013   (CN) .......................... 2013 1 0004817

(51) Int. Cl.
| | |
|---|---|
| H02J 7/00 | (2006.01) |
| H02J 9/00 | (2006.01) |
| H02J 9/04 | (2006.01) |
| H02J 1/00 | (2006.01) |
| B60L 8/00 | (2006.01) |
| H02J 9/06 | (2006.01) |

(52) U.S. Cl.
CPC ................ H02J 9/04 (2013.01); B60L 8/003 (2013.01); H02J 1/00 (2013.01); H02J 9/061 (2013.01); *H02J 2001/006* (2013.01); *Y02T 10/7083* (2013.01); *Y10T 307/625* (2015.04)

(58) Field of Classification Search
CPC ...... H02J 9/04; H02J 9/061; H02J 1/00; H02J 2001/006; B60L 8/003; Y02T 10/7083; Y10T 307/625
USPC ........................................................... 307/66
See application file for complete search history.

(56) References Cited

U.S. PATENT DOCUMENTS

| | | | |
|---|---|---|---|
| 2009/0319209 A1* | 12/2009 | Lim .................... | G01R 31/3648 702/63 |
| 2011/0291606 A1* | 12/2011 | Lee ....................... | B60L 11/182 320/101 |

FOREIGN PATENT DOCUMENTS

| | | |
|---|---|---|
| CN | 102496985 A | 6/2012 |
| CN | 202309139 U | 7/2012 |

* cited by examiner

*Primary Examiner* — Richard Tan
(74) *Attorney, Agent, or Firm* — Jun He Law Offices P.C.; James J. Zhu

(57) ABSTRACT

An emergency power source comprises a housing. A battery pack (4) is arranged in the housing for storing electric energy. The input end of the battery pack (4) is connected to a charging circuit (1) for charging the battery pack (4) and the output end of a solar energy panel input circuit (2), the output end of the battery pack (4) is connected to a heavy-current output circuit (7) for outputting a heavy current when an automobile starts, and an external battery intelligent detection system (6) is connected between the battery pack (4) and the heavy-current output circuit (7). The emergency power source is convenient for charging, can output a heavy current for starting an automobile, and can also accurately control heavy-current output.

12 Claims, 3 Drawing Sheets

EMERGENCY POWER SOURCE

CROSS-REFERENCE TO RELATED APPLICATION

This application is a U.S. national phase application of International Application No. PCT/CN2013/086774, filed with the State Intellectual Property Office of P. R. China on Nov. 8, 2013, which claims priority and benefit to Chinese Patent Application No. 201310004817.1, filed with the State Intellectual Property Office of P. R. China on Jan. 7, 2013, the entire content of which is incorporated herein by reference.

TECHNICAL FIELD

The present invention relates to the technical field of direct current power source, and more particularly, to an emergency power source for powering various types of devices.

BACKGROUND

With the development of technology and the improvement of people's living standard, cars, mobile phones, computers and digital cameras have been essential items for people's living, outing and travelling. These items are all battery-powered, and thus, they may completely lose their functionality when the power source is used up, and thus is inconvenient for people's life. Therefore, for each product, the manufacturer usually provides a corresponding charger to convert the 220V municipal electricity into a direct current power source of a voltage suitable to recharge the product, but this kind of charger can not meet outdoor recharging demands. For vehicles, it frequently occurs that the vehicle can not be started, especially for the vehicle in a travel trip, it may be difficult to get started due to insufficient power or low temperature, which is inconvenient for the users.

A prior Chinese patent document CN 101685974A discloses a mobile power having a battery pack, a charging circuit, a MCU micro controller circuit and a DC-DC voltage regulating output circuit. The charging circuit has an input terminal that may be connected to an external power source, and an output terminal of the charging circuit is electrically connected to the battery pack. Moreover, the battery pack is electrically connected to the MCU micro controller circuit and the DC-DC voltage regulating output circuit, the MCU micro controller circuit is electrically connected to the charging circuit and the DC-DC regulator output circuit and controls the two circuits. The above technical solution has the following advantages: simple circuit schematic, smaller size, light-weight for carrying, easy for controlling, intelligence, low power consumption and versatility, rechargeability using municipal electricity, capability of charging a variety of electronic products with different output conversion terminals or being charged by these electronic products, convenience for managing, carrying and use. The prior patent application solves the problem of outputting power under various voltage levels and having a recharging function, but it can not be used as the vehicle starter because it does not have the high-current outputting capability. In addition, the output current according to the above patent application document is direct current. But in practice, many external equipments need alternating current input, thus the prior patent application failed to solve the problem of powering such equipments in emergency.

SUMMARY

An objective of the present invention is to provide an emergency power source, which is easy to be recharged, to output a high current for starting a vehicle and accurately control the outputting of high current.

To achieve the above objective, the present invention uses the following technical solutions.

An emergency power source has a housing. The housing has at its inside a batter pack for storing electric energy. Input terminals of the battery pack are connected to output terminals of a charging circuit and a solar panel input circuit, output terminals of the battery pack are connected to a high current outputting circuit for outputting a high current used for starting a vehicle, and an external smart battery detection system is connected between the battery pack and the high current outputting circuit.

In certain embodiments, the battery pack consists of lithium-ion batteries connected in series or parallel, each battery having a positive electrode made of lithium iron phosphate, lithium cobalt oxide, nickel cobalt manganese ternary lithium or lithium manganate and a negative electrode made of artificial or natural graphite, the output terminal of the battery pack is further connected to a multipath DC-DC voltage regulator circuit and a LED driving circuit, each path of the DC-DC voltage regulator circuit is connected to a MCU controller circuit, and the MCU controller circuit is further connected to a smart LED electric quantity display system for displaying the electric quantity of the emergency power source, an output terminal of the LED driving circuit is connected to a LED lighting lamp, and an equalization protection circuit is connected in parallel with the battery pack for protecting the battery pack.

In certain embodiments, the external smart battery detection system includes a red power source clip and a black power source clip for connecting with an external battery, a relay switchable between an ON state and an OFF state according to a detection signal, a voltage identifying system for identifying the voltage of an external lead-acid battery or a lithium-ion starting battery, and a current identifying system for identifying a current flowing through an external starting circuit, two terminals of a coil of the relay are connected to the voltage identifying system, an input terminal of the relay is connected to the current identifying system, an output terminal of the relay is connected to the high current outputting circuit, the red and black power source clips are connected to the positive and negative electrodes of the battery pack through an reverse-insertion-proof connector or welded wires, the voltage identifying system is connected to the red and black power source clips, the relay is a 12V or 24V relay with a rating current ranging from 20 A to 300 A and 4 to 6 pins, the external smart battery detection system is either disposed outside the emergency power source and connected to the emergency power source through a reverse-insertion-proof connector, or disposed inside the emergency power source while the red and black power source clips is disposed outside the emergency power.

In certain embodiments, when the red and black power source clips are respectively connected to the positive and negative electrodes of the external battery, if the connection is correct, a feedback voltage displayed by the voltage identifying system is positive, otherwise the feedback voltage is negative; wherein the positive feedback voltage ranges from value a of 6 to 24 V to value b of 9 to 30 V and a is smaller than b; when the feedback voltage ranges from value a to value b and is of a positive value, the coil of the relay receives an electric signal so that its contact is closed and its output terminal is coupled to the input terminal of the high current outputting circuit so that the emergency power source starts to power an external device with a high current; then the current identifying system detects the current flowing through the high current outputting circuit, if the current is lower than value c, which ranges from 0.1 A to 10 A, the electrical signal across the coil of the relay disappears so that the contact is open, said output terminal is disconnected from the high current outputting circuit to stop powering the external device with the high current; and wherein the high current outputting circuit has an output voltage of 12V DC or 24V DC, and an instantaneous current ranging from 100 A to 600 A.

In certain embodiments, the DC-DC voltage regulator circuit includes a DC-DC 19V boost circuit having an output voltage of 19V, a DC-DC 12V output circuit having an output voltage of 12V, and a DC-DC 5V buck circuit having an output voltage of 5V.

In certain embodiments, an output terminal of the DC-DC 12V output circuit is connected to an alerting system for transmitting an alerting signal, an inverter circuit for converting electric energy outputted by the battery pack from direct current form to alternating current form, and a smart heating system for heating the battery pack.

In certain embodiments, the voltage of the alternating current electric energy outputted by the inverter circuit ranges from 110V to 220V, and the inverter circuit is either disposed inside the housing or external to the housing.

In certain embodiments, the smart heating system includes a heating wire or a heating sheet wrapped around the outside of the battery pack, a thermistor attached onto an outer surface of the battery pack and connected to the heating wire or the heating sheet, a heating starting switch for starting the smart heating system, the heating wire or the heating sheet having a resistance ranging from 0.1Ω to 10Ω; wherein an upper limit temperature t of a surface temperature of the battery pack is preset to range from 0° C. to 70° C., if the surface temperature of the battery pack fed back by the thermistor to the MCU controller circuit is lower than the upper limit temperature t, then the heating starting switch is switched on so that a heating current flows through the heating wire or heating sheet to heat the battery pack. The heating time is preset as a fixed value d ranging from 10 s to 300 s. If the surface temperature of the battery pack reaches the upper limit temperature t, the heating starting switch is automatically switched off, or if the heating time reaches value d, the heating circuit of the smarting heating system is automatically switched off.

In certain embodiments, the housing is made of plastic material, aluminum material or composite material, the solar panel input circuit is disposed on the outside of the housing, which has a power ranging from 0.5 W to 50 W and an input voltage ranging from 5V to 25V.

In certain embodiments, a disposable or recoverable fuse is further connected between the output terminal of the battery pack and the external smart battery detection system, which has a rating fusing current ranging from 50 A to 500 A.

In certain embodiments, a circuit of the current identifying system includes: a high-accuracy operational amplifier U3 whose model is SGM8591, resistors R12, R13, R14, R15, R16, R17, R18, R20, R21 and RS, capacitors C9 and C12, a switching diode D4 whose model is IN4148; and wherein pin 1 of U3 is floating, pin 2 of U3 is connected with a terminal of R16, a terminal of R15 and a terminal of R21, pin 3 of U3 is connected with a terminal of C12, a terminal of RS, and a negative electrode of BT2, pin 4 of U3 is grounded with a negative electrode of BT1 and the other terminal of RS, pin 5 of U3 is floating, pin 6 of U3 is connected with a terminal of R20, the other terminal of R21 and a positive electrode of D4, the other terminal of R20 is connected to the other terminal of C12, pin 7 of U3 is connected with terminal VCC and a terminal of C9, the other terminal of C9 is grounded, pin 8 of U3 is floating, a negative electrode of D4 is connected to a terminal of R17, the other terminal of R17 is connected with a terminal of R18 and terminal IN2, the other terminal of R18 is grounded, the other terminal of R15 is connected with a terminal of R12, a terminal of R13, and a terminal of R14.

In certain embodiments, a circuit of the voltage identifying system includes: a dual operational amplifier U2 whose model is LM358, a three-terminal voltage regulator circuit U1 whose model is 7805, resistors R1, R2, R4, R5, R6, R7, R8, R9, R10 and R11, capacitors C1, C2, C3, C4, C5, C6, C7 and C8, schottky diodes D1 and D2 whose model are SS14, and a three-terminal adjustable shunt voltage reference U4 whose model is TL431; and wherein pin 1 of U2 is connected with a terminal of R5, a terminal of C5 and a terminal of C4, the other terminal of R5 is connected with a terminal of R6 and terminal IN1, the other terminal of R6 is grounded, pin 2 of U2 is connected to pin 5 of U2, a terminal of R11, a negative electrode of U4, a reference electrode of U4, and the other terminal of R16, the other terminal of R11 is connected to terminal VCC, pin 3 of U2 is connected with the other terminal of C5, a terminal of R1, a terminal of R7 and a terminal of R8, the other terminal of R1 is connected to the other terminal of C4, pin 4 of U2 is grounded with the other terminal of R7, a positive electrode of U4 and a terminal of R9, the other terminal of R8 is connected with a negative electrode of D2 and a terminal of R10, a positive electrode of D2 is connected to a positive electrode of BT2, pin 6 of U2 is connected with the other terminal of R10, the other terminal of R9, a terminal of C6 and a terminal of R2, pin 7 of U2 is connected with the other terminal of C6, a terminal of C7 and a terminal of R4, the other terminal of R4 is connected to node A, the other terminal of C7 is connected to the other terminal of R2, pin 8 of U2 is connected with a terminal of C8, a terminal of C2, a terminal of C3, pin 3 of U1 and terminal VCC, the other terminal of C8 is grounded, the other terminal of C2 is grounded with the other terminal of C3, pin 1 of U1 is connected with a terminal of C1 and a negative electrode of D1, pin 2 of U1 is grounded with the other terminal of C1, a positive electrode of D1 is connected to the positive electrode of BT1.

In certain embodiments, a circuit of the relay includes: a three-terminal regulator chip U5 whose model is XC6219; resistors R3, R19 and R22; capacitors C11, C13 and C14; a schottky diode D5 whose model is SS14; a MCU controller chip J1; control switches Q1, Q2 and Q3 whose model are SI2300 and a relay; wherein pin 1 of U5 is connected with a terminal of C13, pin 3 of U5 and terminal VCC, pin 2 of U5 is grounded with the other terminal of C13, a terminal of C14, and pin 2 of J1, pin 4 of U5 is floating, pin 5 of U5 is connected with the other terminal of C14 and pin 1 of J1, pin 3 of J1 is connected to terminal IN1, pin 4 of J1 is connected to terminal OUT1, pin 5 of J1 is connected to terminal IN2, pin 6 of J1 is connected to terminal OUT2, pin 7 of J1 is floating, pin 8 of J1 is floating, terminal OUT1 is connected to a terminal of R3, the other terminal of R3 is connected to a gate of Q2, a drain of Q2 is connected to a source of Q3 and the other terminal of R13, a drain of Q3 is connected to the other terminal of R12, a gate of Q3 is connected to node A, a source of Q2 is connected with a source of Q1 and the other terminal of R14, a gate of Q1 is connected to a terminal of R19, the other terminal of R19 is connected to terminal OUT2, a drain of Q1 is connected with a positive electrode of D5 and a terminal of the coil of the relay, a negative electrode of D5 is connected with the other terminal of the coil of the relay, a terminal of a normally open contact of the relay, a terminal of R22, and a positive electrode of BT1, the other terminal of R22 is connected to a terminal of C11, the other terminal of C11 is connected with a terminal of the normally open contact of the relay and a positive electrode of BT2.

The present invention has the following advantages. The emergency power source of the present invention uses lithium-ion batteries as its battery pack, which have characteristics of light weight, small size, durability, high instantaneous discharging current and rechargeability, which can meet the demand of high current for starting a vehicle. By coupling an external smart battery detection system between the high current outputting circuit and the battery pack, the high current being supplied to external devices can be efficiently, accurately and reliably controlled. The battery pack of the emergency power source is also connected to a voltage regulator circuit for outputting a variety of voltage levels, and thus outdoor power demands of mobile phones, computers, digital cameras, car playing pumps, car refrigerators, car cleaners and so on can be satisfied by connecting the output terminal of the respective path of the voltage regulator circuit to the MCU controller circuit. The LED lighting lamp may provide outdoor lighting. The emergency power source itself may be charged by an external power source or solar energy, thereby the emergency power source can be automatically charged outdoors. In addition, the emergency power source has an alerting system, when the user is lost or some condition occurs, he or she can press on the start button of the alerting system to notice people around for help by activating a light or sound indicator of the alerting system. The emergency power source is also connected to the inverter circuit and the smart heating system, wherein the inverter circuit may convert electric energy in direct current form outputted by the battery pack into alternating current from, so that the power-shortage devices needing alternating current can be powered outdoors. The smart heating system has a heating wire or heating sheet and a thermal resistor, and may heat the battery pack of the power source under low environmental temperature to ensure normal working of the battery pack and provide electric energy. Moreover, the emergency power source has distinct red and black battery clips, which can effectively prevent reverse connection of the positive and negative electrodes when powering the external failure batteries, thereby are more convenient to the users.

In the above figures: 1—charging circuit; 2—solar panel input circuit; 3—equalization protection circuit; 4—battery pack; 5—fuse; 6—external smart battery detection system; 7—high current outputting circuit; 8—smart LED electric quantity display system; 9—DC-DC 5V buck circuit; 10—12V output circuit; 11—DC-DC 19V boost circuit; 12—LED driving circuit; 13—LED lighting lamp; 14—MCU controller circuit; 15—alerting system; 16—smart heating system; 17—inverter circuit; 61—circuit of voltage identifying system, 62—circuit of current identifying system; 63—circuit of relay.

DETAILED DESCRIPTION

With reference to the accompanying drawings and specific embodiments, the present invention will be further described.

Figure 1:
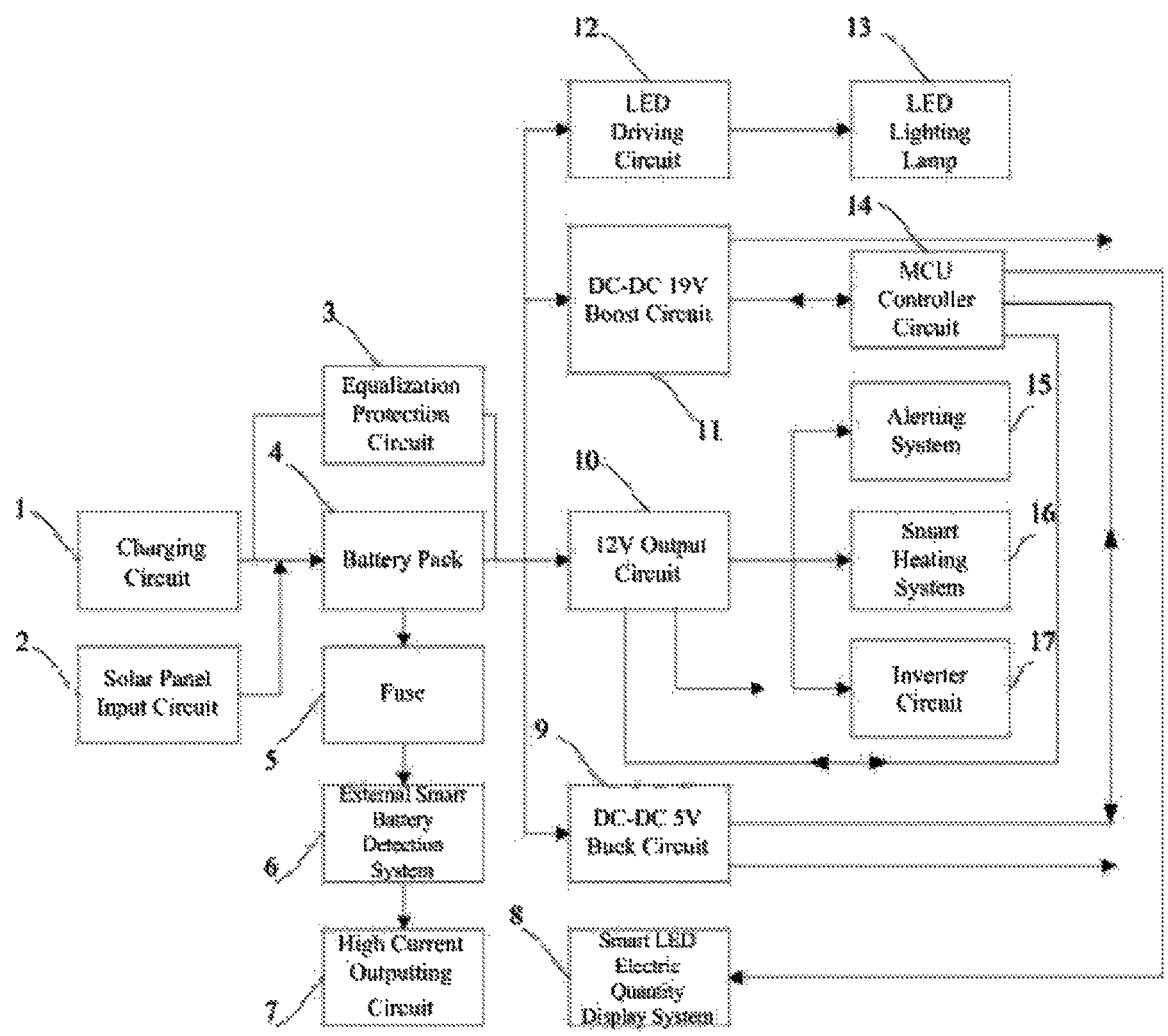
FIG. 1 is a block diagram of an emergency power source of the invention.
Figure 2:
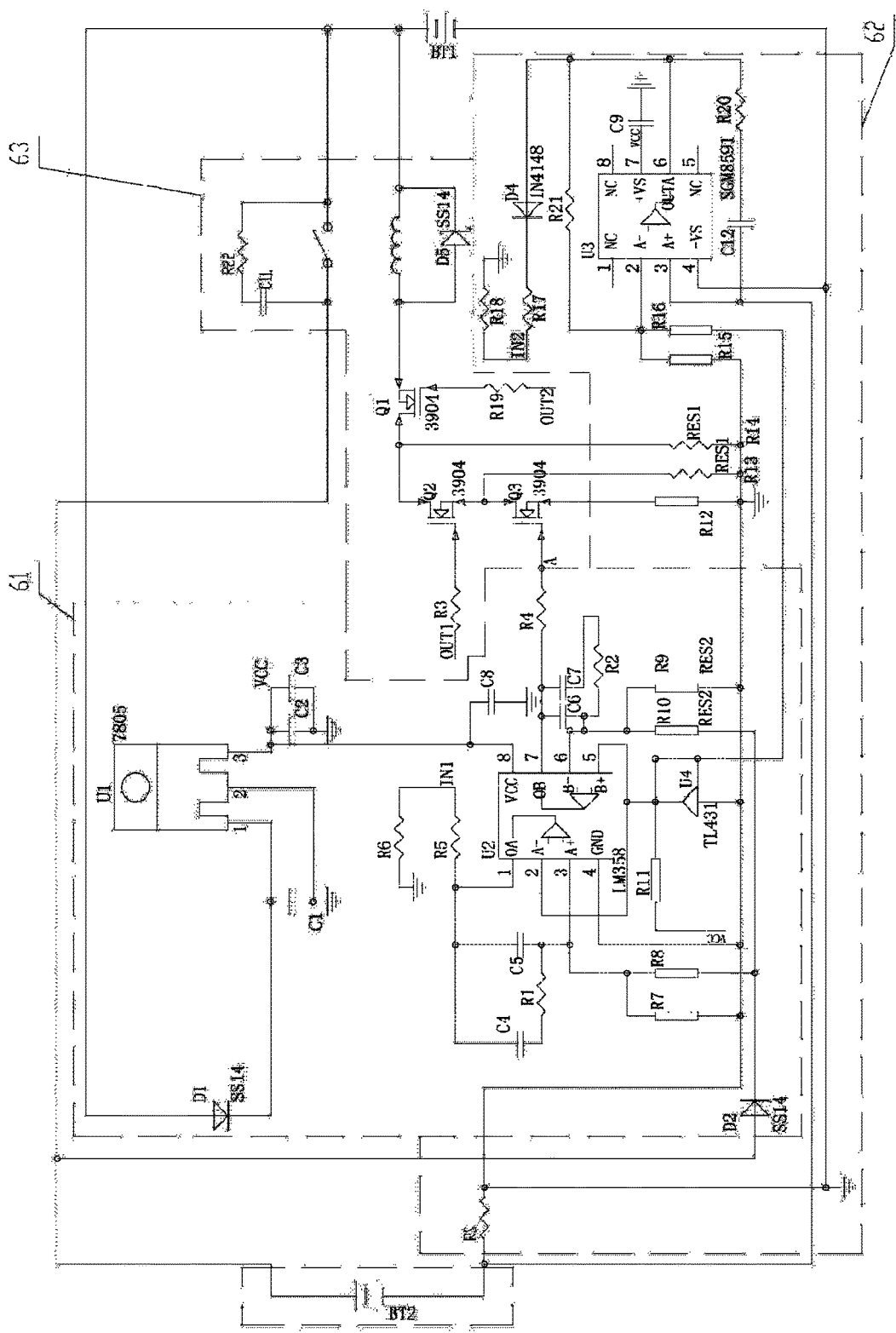
FIG. 2 is a first circuit diagram of an external smart battery detection system for an emergency power source of the invention.
Figure 3:
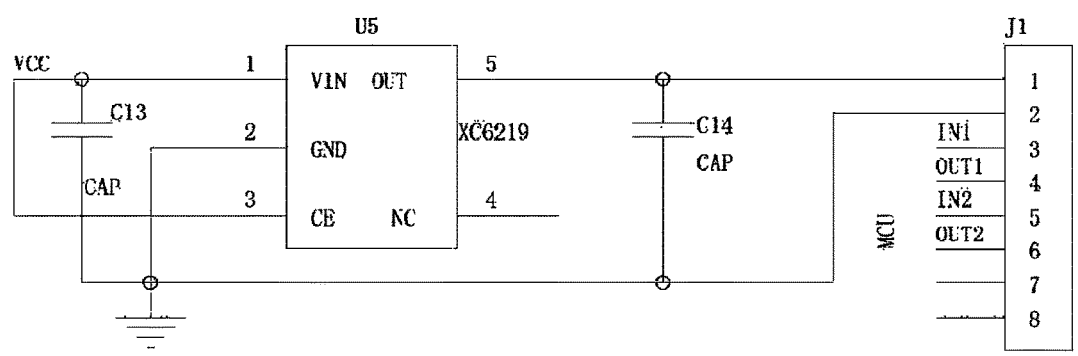
FIG. 3 is a second circuit diagram of an external smart battery detection system shown in FIG. 2.

As shown in FIGS. 1 to 3, an emergency power source includes a housing having at its inside a battery pack 4 for storing electric energy. Input terminals of the battery pack 4 are connected to output terminals of a charging circuit 1 and a solar panel input circuit 2, output terminals of the battery pack 4 are connected to a high current outputting circuit 7 for outputting a high current used for starting a vehicle, and an external smart battery detection system 6 is connected between the battery pack 4 and the high current outputting circuit 7. Furthermore, the battery pack 4 consists of lithium-ion batteries connected in series or parallel, each having a positive electrode made of lithium iron phosphate, lithium cobalt oxide, nickel cobalt manganese ternary lithium or lithium manganate and a negative electrode made of artificial or natural graphite. The output terminals of the battery pack are further connected to a multipath DC-DC voltage regulator circuit and a LED driving circuit 12, each path of the DC-DC voltage regulator circuit is connected to a MCU controller circuit 14, and the MCU controller circuit 14 is further connected to a smart LED electric quantity display system 8 for displaying the electric quantity of the emergency power source, an output terminal of the LED driving circuit 12 is connected to a LED lighting lamp 13, and an equalization protection circuit 3 is connected in parallel with the battery pack 4 for protecting the battery pack 4. The DC-DC voltage regulator circuit includes a DC-DC 19V boost circuit 11 of an output voltage of 19V, a DC-DC 12V output circuit 10 of an output voltage of 12V, and a DC-DC 5V buck circuit 9 of an output voltage of 5V. In addition, the housing of the emergency power source of the invention is made of plastic material, aluminum material or composite material. The solar panel input circuit 2 is disposed outside of the housing, and has a power ranging from 0.5 W to 50 W and an input voltage ranging from 5V to 25V.

The emergency power source uses lithium-ion batteries as its battery pack, which has the characteristics of light weight, small size, durability, high instantaneous discharge current and rechargeability, which is capable of supplying a high current for starting a vehicle. By connecting the external smart battery detection system between the high current outputting circuit and the battery pack, the high current can be efficiently, accurately and reliably controlled, and the electric energy can be used more efficiently. The battery pack of the emergency power source is also connected to the voltage regulator circuit for outputting a variety of voltage levels, and by connecting the output terminal of the respective path of the voltage regulator circuit to the MCU controller circuit, various outdoor power demands of mobile phones, computers, digital cameras, car playing pumps, car refrigerators, car cleaners, etc. can be satisfied. The LED lighting lamp may provide outdoor lighting. Moreover, by a smart LED electric quantity display system 8, the power usage status of the battery pack 4 in the emergency power source can be detected in real time.

An output terminal of the DC-DC 12V output circuit 10 is connected to an alerting system 15 for transmitting an alerting signal, an inverter circuit 17 for converting electric energy outputted by the battery pack 4 from direct current form to alternating current form, and a smart heating system 16 for heating the battery pack 4. A start button of the alerting system 15 can be pressed by the user when he or she is lost or some condition occurs. The alerting system 15 may notice people around for help by lighting the indicator light or transmitting sounds with the alerting system 15. The voltage of the alternating current power outputted by the inverter circuit 17 ranges from 110V to 220V, which makes the emergency power source easy to be connected to external devices requiring alternating current power, and the voltage matches with the demand and no regulation is needed. Thus, the external devices may be powered outdoors under power shortage situation, to ensure the normal working of such devices. The inverter circuit 17 may be disposed inside the housing, or a connector for connecting the inverter circuit 17 may be provided on the housing. When there is a need for alternating current power supplying, the external inverter can be directly connected to the connector to satisfy the demand for converting direct current form into alternating current form, and the operation is convenient. In addition, the smart heating system 16 includes a heating wire or a heating sheet wrapped around the outside of the battery pack 4, a thermistor attached onto an outer surface of the battery pack 4 and connected to the heating wire or the heating sheet, and a heating starting switch for starting the smart heating system. The heating wire or the heating sheet has a resistance ranging from $0.1\Omega$ to $10\Omega$. When being used, an upper limit temperature t of a surface temperature of the battery pack 4 is preset to range from 0° C. to 70° C. If the external environment temperature is low and affects the normal working of the power source, then the heating starting switch is switched on. If the surface temperature of the battery pack 4 fed back by the thermistor to the MCU controller circuit 14 is lower than t, then the heating starting switch controlling the heating of the heating wire or the heating sheet is switched on so that a heating current flows through the heating wire or the heating sheet, the smart heating system 16 begins to heat the battery pack 4. Before heating, a heating time is preset as a fixed value d ranging from 10 s to 300 s. During the heating process, when the surface temperature of the battery pack 4 reaches the upper limit temperature t, the heating starting switch controlling the heating wire or the heating sheet will be automatically switched off, cutting off the current flowing through the heating wire or the heating sheet. Alternatively, when the heating time reaches value d, the heating circuit of the smart heating system 16 will be automatically switched off to stop heating the battery pack. The smart heating system 16 accurately controls the ON state and OFF state of the heating circuit of the smart heating system 16 using the thermal sensitive property of the thermistor, thereby improving the heating efficiency and reducing the power consumption of the heating. With the smart heating system 16, the emergency power source may ensure the normal working of the battery pack and supplying external devices under low environmental temperature that may affect normal working of the power sources. Thus, the reliability of the entire system is improved.

The external smart battery detection system 6 includes a red power source clip and a black power source clip for connecting with an external battery, a relay switchable between an ON state and an OFF state according to a detection signal, a voltage identifying system for identifying the voltage of an external lead-acid battery or a lithium-ion starting battery, and a current identifying system for identifying a current flowing through an external starting circuit. The voltage identifying system is connected between two terminals of a coil of the relay, an input terminal of the relay is connected to the current identifying system, an output terminal of the relay is connected to the high current outputting circuit 7, the red and black power source clips are connected to the battery pack through an anti-reverse connector connected to the positive and negative electrodes of the battery pack 4 or conducting wires welded to the positive and negative electrodes of the battery pack 4. If the red and black power source clips are connected to an insertable anti-reverse connector such that the voltage identifying system is connected to the red and black power source clips. The relay of the emergency power source of the invention is a 12V or 24V relay with a rating current ranging from 20 A to 300 A and 4 to 6 pins. The external smart battery detection system 6 is disposed outside the emergency power source and connected to the emergency power source through an anti-reverse connector, or is disposed inside the emergency power source with the red and black power source clips disposed outside the emergency power. Preferably, in certain embodiments of the invention, the external battery detection system 6 is disposed inside the emergency power source with the red and black power source clips disposed outside the emergency power source. The red and black power source clips and the battery pack 4 are connected with each other by silicone wire or other wires, to connect with the external devices. Reverse connection or short-circuit condition caused by the contact of the red and black power source clip can be avoided by connecting the red and black power source clips to the external batteries.

When the red and black power source clips are respectively connected to the positive and negative electrodes of the external battery, if the connection is correct, a feedback voltage displayed by the voltage identifying system is positive, otherwise the feedback voltage is negative. The positive feedback voltage ranges from value a of 6 to 24 V to value b of 9 to 30 V, and a is smaller than b. If the connection is reverse, the relay does not work, and the high current outputting circuit 7 may be cut off. If the external smart battery detection system 6 fails, to further ensure the safety of the emergency power source, in the circuit of the emergency power source of the invention, a disposable or recoverable fuse 5 is provided and is connected between the output terminals of the battery pack 4 and the external smart battery detection system 6. The fuse 5 has a rating fusing current ranging from 50 A to 500 A. To ensure the safety of charging or discharging the battery pack 4, an equalization protection circuit 3 is connected in parallel with the battery pack 4, providing over-current, overload, overcharging or over-discharging protection for the battery pack 4.

In this invention, when the feedback voltage ranges from value a to value b and is of a positive value, the coil of the relay receives a voltage signal so that its contact is closed and its output terminal is coupled to the high current outputting circuit 7, and the emergency power source starts to power an external device with a high current. At this time, the current identifying system detects the current flowing through the high current outputting circuit 7. If the current is lower than value c, which ranges from 0.1 A to 10 A, the voltage signal across the coil of the relay disappears, the contact is then open, thus its output terminal is disconnected from the high current outputting circuit 7 to stop powering the external device with the high current. The high current outputting circuit 7 has an output voltage of 12V DC or 24V DC, and an instantaneous current ranging from 100 A to 600 A, which can be used as a starting power source for vehicles in emergency. Powering the external device with the high current can be efficiently, accurately and reliably controlled, and the electric energy can be efficiently used by connecting the external smart battery detection system 6 between the high current outputting circuit 7 and the battery pack 4. The external smart battery detection system 6 can be disposed inside the housing or external to the housing.

FIGS. 2 and 3 show a circuit diagram of the external smart battery detection system 6. BT1 is a rechargeable battery, which is the battery pack 4 in FIG. 1, and BT2 is a vehicle battery to be charged.

Specifically, a circuit 62 of the current identifying system includes: a high-accuracy operational amplifier U3 whose model is SGM8591, resistors R12, R13, R14, R15, R16, R17, R18, R20, R21 and RS, capacitors C9 and C12, a switching diode D4 whose model is IN4148; and wherein pin 1 of U3 is floating, pin 2 of U3 is connected with a terminal of R16, a terminal of R15 and a terminal of R21, pin 3 of U3 is connected with a terminal of C12, a terminal of RS, and a negative electrode of BT2, pin 4 of U3 is grounded with a negative electrode of BT1 and the other terminal of RS, pin 5 of U3 is floating, pin 6 of U3 is connected with a terminal of R20, the other terminal of R21 and a positive electrode of D4, the other terminal of R20 is connected to the other terminal of C12, pin 7 of U3 is connected with terminal VCC and a terminal of C9, the other terminal of C9 is grounded, pin 8 of U3 is floating, a negative electrode of D4 is connected to a terminal of R17, the other terminal of R17 is connected with a terminal of R18 and terminal IN2, the other terminal of R18 is grounded, the other terminal of R15 is connected with a terminal of R12, a terminal of R13, and a terminal of R14.

Specifically, the circuit 61 of the voltage identifying system includes: a dual operational amplifier U2 whose model is LM358, a three-terminal voltage regulator circuit U1 whose model is a 7805, resistors R1, R2, R4, R5, R6, R7, R8, R9, R10 and R11, capacitors C1, C2, C3, C4, C5, C6, C7 and C8, schottky diodes D1 and D2 whose model are SS14, and a three-terminal adjustable shunt voltage reference U4 whose model is TL431; and wherein pin 1 of U2 is connected with a terminal of R5, a terminal of C5 and a terminal of C4, the other terminal of R5 is connected with a terminal of R6 and terminal IN1, the other terminal of R6 is grounded, pin 2 of U2 is connected to pin 5 of U2, a terminal of R11, a negative electrode of U4, a reference electrode of U4, and the other terminal of R16, the other terminal of R11 is connected to terminal VCC, pin 3 of U2 is connected with the other terminal of C5, a terminal of R1, a terminal of R7 and a terminal of R8, the other terminal of R1 is connected to the other terminal of C4, pin 4 of U2 is grounded with the other terminal of R7, a positive electrode of U4 and a terminal of R9, the other terminal of R8 is connected with a negative electrode of D2 and a terminal of R10, a positive electrode of D2 is connected to a positive electrode of BT2, pin 6 of U2 is connected with the other terminal of R10, the other terminal of R9, a terminal of C6 and a terminal of R2, pin 7 of U2 is connected with the other terminal of C6, a terminal of C7 and a terminal of R4, the other terminal of R4 is connected to node A, the other terminal of C7 is connected to the other terminal of R2, pin 8 of U2 is connected with a terminal of C8, a terminal of C2, a terminal of C3, pin 3 of U1 and terminal VCC, the other terminal of C8 is grounded, the other terminal of C2 is grounded with the other terminal of C3, pin 1 of U1 is connected with a terminal of C1 and a negative electrode of D1, pin 2 of U1 is grounded with the other terminal of C1, a positive electrode of D1 is connected to the positive electrode of BT1.

Specifically, the circuit 63 of the relay includes: a three-terminal regulator chip U5 whose model is XC6219; resistors R3, R19 and R22; capacitors C11, C13 and C14; a schottky diode D5 whose model is SS14; a MCU controller chip J1; control switches Q1, Q2 and Q3 whose model are SI2300 and a relay; wherein pin 1 of U5 is connected with a terminal of C13, pin 3 of U5, terminal VCC, pin 2 of U5 is grounded with the other terminal of C13, a terminal of C14, and pin 2 of J1, pin 4 of U5 is floating, pin 5 of U5 is connected with the other terminal of C14 and pin 1 of J1, pin 3 of J1 is connected to terminal IN1, pin 4 of J1 is connected to terminal OUT1, pin 5 of J1 is connected to terminal IN2, pin 6 of J1 is connected to terminal OUT2, pin 7 of J1 is floating, pin 8 of J1 is floating, terminal OUT1 is connected to a terminal of R3, the other terminal of R3 is connected to a gate of Q2, a drain of Q2 is connected to a source of Q3 and the other terminal of R13, a drain of Q3 is connected to the other terminal of R12, a gate of Q3 is connected to node A, a source of Q2 is connected with a source of Q1 and the other terminal of R14, a gate of Q1 is connected to a terminal of R19, the other terminal of R19 is connected to terminal OUT2, a drain of Q1 is connected with a positive electrode of D5 and a terminal of the coil of the relay, a negative electrode of D5 is connected with the other terminal of the coil of the relay, a terminal of a normally open contact of the relay, a terminal of R22, and a positive electrode of BT1, the other terminal of R22 is connected to a terminal of C11, the other terminal of C11 is connected with a terminal of the normally open contact of the relay and a positive electrode of BT2.

When the emergency power source is disconnected from the external rechargeable battery, or the current is smaller than the preset current value, R15 and R16 in the circuit 62 of the current identifying system provide a detection signal to U3. Then U3 sends an output signal to the MCU controller chip according to the detection signal, based on which the MCU controller chip may determine the ON or OFF state of the circuit to make proper instructions. When the preset voltage value is 8.1V and the output voltage value is smaller than the preset value, R7 and R8 of the circuit 61 of the voltage identifying system may provide a detection signal to U2, and U2 may send an output signal to terminal IN1 according to the detection signal. Then the MCU controller chip further controls the control switch Q2 in the circuit 63 of the relay according to the signal from terminal IN1. When the output voltage is bigger than a preset value, which may be 12.6V in the invention, R9 and R10 of the circuit 61 of the voltage identifying system may provide a detection signal to U2, and U2 may send a signal according to the detection signal to control the control switch Q3 in the circuit 63 of the relay. In this invention, the circuit 61 of the voltage identifying system and the circuit 62 of the current identifying system co-operate to provide the signal to the MCU controller chip. With the determination of the MCU controller chip, the switches Q1, Q2 and Q3 in the circuit 63 of the replay can be controlled to achieve charging and protecting.

The foregoing are merely preferred embodiments of the present invention, which is not intended to limit the invention. For a person skilled in the art, various modifications and variations can be made to the present invention. Any modifications, equivalents and improvements within the spirit and principle of the present invention should be included within the scope of the present invention.

What is claimed is:

1. An emergency power source comprising a housing, said housing having at its inside a batter pack (4) for storing electric energy, wherein
   input terminals of the battery pack (4) are connected to output terminals of a charging circuit (1) and a solar panel input circuit (2), output terminals of the battery pack (4) are connected to a high current outputting circuit (7) for outputting a high current used for starting a vehicle,
   an external smart battery detection system (6) is connected between the battery pack (4) and the high current outputting circuit (7),
   the external smart battery detection system (6) comprises
   a red power source clip and a black power source clip for connecting with an external battery,
   a relay switchable between an ON state and an OFF state according to a detection signal,
   a voltage identifying system for identifying the voltage of an external lead-acid battery or a lithium-ion starting battery, and
   a current identifying system for identifying a current flowing through an external starting circuit,
   wherein two terminals of a coil of the relay are connected to the voltage identifying system, an input terminal of the relay is connected to the current identifying system, an output terminal of the relay is connected to the high current outputting circuit (7),
   the red and black power source clips are connected to the positive and negative electrodes of the battery pack (4) through a reverse-insertion-proof connector or welded wires, the voltage identifying system is connected to the red and black power source clips.

2. The emergency power source according to claim 1, wherein
   the relay is a 12V or 24V relay with a rating current ranging from 20 A to 300 A and 4 to 6 pins,
   the external smart battery detection system (6) is either disposed outside the emergency power source and connected to the emergency power source through a reverse-insertion-proof connector, or disposed inside the emergency power source while the red and black power source clip is disposed outside the emergency power source.

3. The emergency power source according to claim 2, wherein
   when the red and black power source clips are respectively connected to the positive and negative electrodes of the external battery, if the connection is correct, a feedback voltage displayed by the voltage identifying system is positive, otherwise the feedback voltage is negative; wherein the positive feedback voltage ranges from value a of 6 to 24 V to value b of 9 to 30 V, and a is smaller than b;
   when the feedback voltage ranges from value a to value b and is of a positive value, the coil of the relay receives an electric signal so that its contact is closed and its output terminal is coupled to the input terminal of the high current outputting circuit, the high current outputting circuit (7) is switched on, and the emergency power source starts to power an external device with a high current; then the current identifying system detects the current flowing through the high current outputting circuit (7), if the current is lower than value c, which ranges from 0.1 A to 10 A, the electrical signal across the coil of the relay disappears so that the contact is open, said output terminal is disconnected from the high current outputting circuit to stop powering the external device with the high current; and
   wherein the high current outputting circuit (7) has an output voltage of 12V DC or 24V DC, and an instantaneous current ranging from 100 A to 600 A.

4. An emergency power source comprising a housing, said housing having at its inside a batter pack (4) for storing electric energy, wherein
   input terminals of the battery pack (4) are connected to output terminals of a charging circuit (1) and a solar panel input circuit (2), output terminals of the battery pack (4) are connected to a high current outputting circuit (7) for outputting a high current used for starting a vehicle,
   an external smart battery detection system (6) is connected between the battery pack (4) and the high current outputting circuit (7),
   the output terminals of the battery pack are further connected to a multipath DC-DC voltage regulator circuit comprising
   a DC-DC 19V boost circuit (11) having an output voltage of 19V,
   a DC-DC 12V output circuit (10) having an output voltage of 12V, and
   a DC-DC 5V buck circuit (9) having an output voltage of 5V,
   an output terminal of the DC-DC 12V output circuit (10) is connected to an alerting system (15) for transmitting an alerting signal, an inverter circuit (17) for converting electric energy outputted by the battery pack (4) from direct current to alternating current, and a smart heating system (16) for heating the battery pack (4).

5. The emergency power source according to claim 4, wherein
   the battery pack (4) consists of lithium-ion batteries connected in series or parallel, each battery having a positive electrode made of lithium iron phosphate, lithium cobalt oxide, nickel cobalt manganese ternary lithium or lithium manganate and a negative electrode made of artificial or natural graphite, the output terminals of the battery pack are further connected to a LED driving circuit (12), each path of the DC-DC voltage regulator circuit is connected to a MCU controller circuit (14), and the MCU controller circuit (14) is further connected to a smart LED electric quantity display system (8) for displaying the electric quantity of the emergency power source, an output terminal of the LED driving circuit (12) is connected to a LED lighting lamp (13), and an equalization protection circuit (3) is connected in parallel with the battery pack (4) for protecting the battery pack (4).

6. The emergency power source according to claim 5, wherein the voltage of the alternating current electric energy outputted by the inverter circuit (17) ranges from 110V to 220V, and the inverter circuit (17) is either disposed inside the housing or external to the housing.

7. The emergency power source according to claim 5, wherein the smart heating system (16) comprises
   a heating wire or a heating sheet wrapped around the outside of the battery pack (4),
   a thermistor attached onto an outer surface of the battery pack (4) and connected to the heating wire or the heating sheet,
   a heating starting switch for starting the smart heating system (16), wherein the heating wire or the heating sheet has a resistance ranging from 0.1Ω to 10Ω;

wherein an upper limit temperature t of a surface temperature of the battery pack (4) is preset to range from 0° C. to 70° C., if the surface temperature of the battery pack (4) fed back by the thermistor to the MCU controller circuit (14) is lower than the upper limit temperature t, then the heating starting switch is switched on so that a heating current flows through the heating wire or heating sheet to heat the battery pack (4); a heating time is preset as a fixed value d ranging from 10 s to 300 s, if the surface temperature of the battery pack (4) reaches the upper limit temperature t, the heating starting switch is automatically switched off, or if the heating time reaches value d, the heating circuit of the smarting heating system is automatically switched off.

8. The emergency power source according to claim 1, wherein
the housing is made of plastic material, aluminum material or composite material,
the solar panel input circuit (2), which is disposed on the outside of the housing, has a power ranging from 0.5 W to 50 W and an input voltage ranging from 5V to 25V.

9. The emergency power source according to claim 1, wherein a disposable or recoverable fuse (5) is further connected between the output terminal of the battery pack (4) and the external smart battery detection system (6), said fuse has a rating fusing current ranging from 50 A to 500 A.

10. The emergency power source according to claim 2, wherein a circuit (62) of the current identifying system comprises:
a high-accuracy operational amplifier U3 whose model is SGM8591, resistors R12, R13, R14, R15, R16, R17, R18, R20, R21 and RS, capacitors C9 and C12, a switching diode D4 whose model is IN4148; and wherein pin 1 of U3 is floating, pin 2 of U3 is connected with a terminal of R16, a terminal of R15 and a terminal of R21, pin 3 of U3 is connected with a terminal of C12, a terminal of RS, and a negative electrode of BT2, pin 4 of U3 is grounded with a negative electrode of BT1 and the other terminal of RS, pin 5 of U3 is floating, pin 6 of U3 is connected with a terminal of R20, the other terminal of R21 and a positive electrode of D4, the other terminal of R20 is connected to the other terminal of C12, pin 7 of U3 is connected with terminal VCC and a terminal of C9, the other terminal of C9 is grounded, pin 8 of U3 is floating, a negative electrode of D4 is connected to a terminal of R17, the other terminal of R17 is connected with a terminal of R18 and terminal IN2, the other terminal of R18 is grounded, the other terminal of R15 is connected with a terminal of R12, a terminal of R13, and a terminal of R14.

11. The emergency power source according to claim 10, wherein a circuit (61) of the voltage identifying system comprises:
a dual operational amplifier U2 whose model is LM358, a three-terminal voltage regulator circuit U1 whose model is 7805, resistors R1, R2, R4, R5, R6, R7, R8, R9, R10 and R11, capacitors C1, C2, C3, C4, C5, C6, C7 and C8, schottky diodes D1 and D2 whose model are SS14, and a three-terminal adjustable shunt voltage reference U4 whose model is TL431; and wherein pin 1 of U2 is connected with a terminal of R5, a terminal of C5 and a terminal of C4, the other terminal of R5 is connected with a terminal of R6 and terminal IN1, the other terminal of R6 is grounded, pin 2 of U2 is connected to pin 5 of U2, a terminal of R11, a negative electrode of U4, a reference electrode of U4, and the other terminal of R16, the other terminal of R11 is connected to terminal VCC, pin 3 of U2 is connected with the other terminal of C5, a terminal of R1, a terminal of R7 and a terminal of R8, the other terminal of R1 is connected to the other terminal of C4, pin 4 of U2 is grounded with the other terminal of R7, a positive electrode of U4 and a terminal of R9, the other terminal of R8 is connected with a negative electrode of D2 and a terminal of R10, a positive electrode of D2 is connected to a positive electrode of BT2, pin 6 of U2 is connected with the other terminal of R10, the other terminal of R9, a terminal of C6 and a terminal of R2, pin 7 of U2 is connected with the other terminal of C6, a terminal of C7 and a terminal of R4, the other terminal of R4 is connected to node A, the other terminal of C7 is connected to the other terminal of R2, pin 8 of U2 is connected with a terminal of C8, a terminal of C2, a terminal of C3, pin 3 of U1 and terminal VCC, the other terminal of C8 is grounded, the other terminal of C2 is grounded with the other terminal of C3, pin 1 of U1 is connected with a terminal of C1 and a negative electrode of D1, pin 2 of U1 is grounded with the other terminal of C1, a positive electrode of D1 is connected to the positive electrode of BT1.

12. The emergency power source according to claim 11, wherein a circuit (63) of the relay comprises:
a three-terminal regulator chip U5 whose model is XC6219; resistors R3, R19 and R22; capacitors C11, C13 and C14; a schottky diode D5 whose model is SS14; a MCU controller chip J1; control switches Q1, Q2 and Q3 whose model are SI2300 and a relay; wherein pin 1 of U5 is connected with a terminal of C13, pin 3 of U5 and terminal VCC, pin 2 of U5 is grounded with the other terminal of C13, a terminal of C14, and pin 2 of J1, pin 4 of U5 is floating, pin 5 of U5 is connected with the other terminal of C14 and pin 1 of J1, pin 3 of J1 is connected to terminal IN1, pin 4 of J1 is connected to terminal OUT1, pin 5 of J1 is connected to terminal IN2, pin 6 of J1 is connected to terminal OUT2, pin 7 of J1 is floating, pin 8 of J1 is floating, terminal OUT1 is connected to a terminal of R3, the other terminal of R3 is connected to a gate of Q2, a drain of Q2 is connected to a source of Q3 and the other terminal of R13, a drain of Q3 is connected to the other terminal of R12, a gate of Q3 is connected to node A, a source of Q2 is connected with a source of Q1 and the other terminal of R14, a gate of Q1 is connected to a terminal of R19, the other terminal of R19 is connected to terminal OUT2, a drain of Q1 is connected with a positive electrode of D5 and a terminal of the coil of the relay, a negative electrode of D5 is connected with the other terminal of the coil of the relay, a terminal of a normally open contact of the relay, a terminal of R22, and a positive electrode of BT1, the other terminal of R22 is connected to a terminal of C11, the other terminal of C11 is connected with a terminal of the normally open contact of the relay and a positive electrode of BT2.

* * * * *